Feb. 24, 1970

J. HIRSCH 3,497,668

TACTILE CONTROL SYSTEM

Filed Aug. 25, 1966

INVENTOR:
JOSEPH HIRSCH

ATTORNEYS

Feb. 24, 1970  J. HIRSCH  3,497,668

TACTILE CONTROL SYSTEM

Filed Aug 25, 1966  2 Sheets-Sheet 2

INVENTOR:
JOSEPH HIRSCH

ATTORNEYS

United States Patent Office 3,497,668
Patented Feb. 24, 1970

3,497,668
TACTILE CONTROL SYSTEM
Joseph Hirsch, 12272 Enramada Drive,
Santa Ana, Calif. 92705
Filed Aug. 25, 1966, Ser. No. 575,004
Int. Cl. G05b 11/01
U.S. Cl. 340—222
8 Claims

ABSTRACT OF THE DISCLOSURE

Control system is disclosed wherein the effect of a manually operated element, such as a machine tool exerted upon an opject such as a workpiece, is visually observed as to the force-position relation to the object, while the change in the balance of forces, particularly, a change in the reaction force is sensed and transformed into a tactile stimulus.

This invention relates to control systems and more particularly to the design of feedback loop type control systems of the non-automatic type in which a human operator is aided by a "quickening" technique, with which rate information is provided to a control operator. Specifically, this invention relates to tactile control systems and more particularly to the use of tactile received information by an operator who thereby achieves more accurate control of machine operations.

U.S. Patent 2,972,140 discloses a system of communication using coded vibratory tactile stimuli. The basic system for communicating through a coding of vibratory tactile stimuli consists of a simple single apparatus whereby the five fingers of the "speaker" rest on sensitive vibration sending diaphragms, and correspondingly, the five fingers of the "listener" rest on sensitive vibration receiving diaphragms. As was also disclosed in the patent, multiple frequencies and combinations could be achieved, for example, by varying the depth to which the sending buttons are pressed, and that sending and receiving could be achieved simultaneously on the same finger by proper design of the apparatus, and other numerous modifications and applications could be made utilizing the basic concept.

U.S. Patent 3,157,853 extended the basic concept contained in U.S. Patent 2,972,140.

For example a ground control operator flying a target drone does not feel the drone's accelerations. Thus, ground control of a flying vehicle is more difficult and the controller's performance is inferior to that of the flying pilot. U.S. Patent 3,157,853 considers supplying the ground control operator with information concerning the vehicle's acceleration or deceleration by tactile stimuli so that the controller observing the plane can respond faster, more assured and accurate. Tests have indicated an overall improvement of 30 percent in the closed loop control system gain using this system in a typical drone control situation. The tactile control system by indicating rate information together with visual display provides a kind of "quickened-display" without the major disadvantage of such a display, i.e., normally such a display does not provide the operator with the actual state of the system.

This control system falls under a category of processes termed "quickening," i.e., to provide an operator with immediate knowledge of the results of his own actions so that he is instantly aware of the effects of these actions. In our system the quickened display being tactile, obviates the instability which would result in an operator having to visually read a dial while proceeding with a visual machine task.

Stated generally, the invention contemplates the provision of means by which intelligence, in this example, tool pressure, is converted to tactile stimuli and transmitted to a machine tool operator. There are many machine operations requiring great accuracy. The part being machined may be one of extreme value on which very close tolerances have been specified, or it may be material that is hazardous, i.e. that used in atomic energy, boron tubes, solid propellants, etc. Other factors being equal, tool pressure is related to the amount of material being removed. Since the tool workpiece rests on the bench or since control itself may be automatic, the operator does not "feel" this tool pressure. He knows, afterwards, by using a gage or by a dial reading how much material has been removed. Using the principles of the present invention, the tool pressure is measured, for example, by using strain gages on the tool shank. Tool pressure will be related to the bending moment applied to the shank. The strain, of course, is proportional to the stress imposed. By converting these strain gage values to vibratory tactile stimuli, the machine tool operator is made aware of the amount of tool pressure that he is applying. Higher frequencies would indicate greater pressure. In certain operations the vibratory tactile signals would not be generated until a critical pressure was approached. In this instance, the tactile stimuli would serve as the fine adjustment to prevent failure of the machine operation.

It should be noted that the tactilely supplied information allows for anticipatory and compensatory control of the particular operation. The tool pressure and its rate of increase or decrease will indicate the amount of material that will be removed as the process proceeds. When obtained, the tactile stimuli will indicate a displacement to come, while the visual stimuli, for example, could be a gage reading an actual displacement.

The eye sees displacement, it does not "feel" rate changes. The addition of the tactile rate link to the visual mode will be non-interfering, natural, and instinctive, i.e., the "buzz" occurring in the direction in which the operator's stick or control handle should be moved to achieve more precise and assured adjustment. By combining the tactilely received rate information and the visual mode, "overshoot" is decreased in that the ballistic and adjust movements are coordinated. Ballistic and adjust movements are inherent in the pattern of motion of a control operator and are uncoordinated by the use of the visual mode only, i.e., during the ballistic movement the operator usually overshoots (coarse control) and then adjusts to achieve his precise position (fine control).

Stated generally, the invention contemplates the provision in a control situation of means by which condition information is transmitted visually to an operator for example by direct observation of a condition or by observation of an instrument displaying an error signal representing the deviation of the desired condition from the existing condition. In addition rate information concerning a change in the balance of forces between a controlled object and the resistance that object finds in its environment is transmitted tactilely to a position on the controller's arm or hand or fingers or any part of his body (for example, the feet might be used in some control situations), so that the controller's movements are made with a knowledge of the rate of change, for example, of displacement magnitudes plus visual observation of the displacement or position of the object itself in its movement. The rate of change information may be components of position, velocity, acceleration, the first derivative of acceleration, force, pressure, temperature, or any parameter in which changes may occur and which represent this change in the balance of forces. These parameters can be amplified, added algebraically, in any coordinate system through a feedback loop going to a tactile display.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Figure 1:
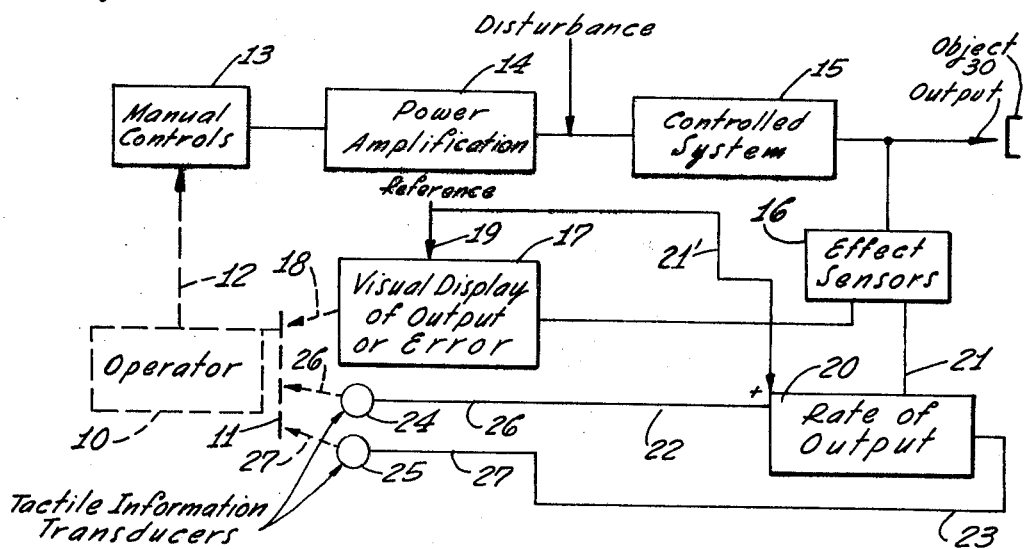
FIG. 1 illustrates somewhat schematically a block diagram of the principal components used in a preferred embodiment of the invention.

Proceeding now to the detailed description of the drawings, in FIG. 1 thereof there is shown in block diagram form the system incorporating the principal features of the invention and constituting a preferred embodiment of practicing the invention. Reference numeral 10 denotes the human operator with numeral 11 schematically denoting a stimuli receiving plane representing his receptors for receiving externally produced stimuli. Reference numeral 12 points to, for example, the physical output of the operator with the aid of which he performs control operations. Thus in most cases this will be, for example, the right hand; but it can be both of his hands, it can also be his foot in case he operates a pedal, etc.

Block 13 is labeled manual controls but this also is to be understood in a more general sense, it may refer to handles or foot pedals. In the most usual case it will be a lever to be actuated by the operator to perform specific control operations. In many instances this manual control device 13 will constitute a lever having a neutral position and being deflectable in at least one plane at either side of the neutral position, to introduce into the device 15 to be controlled, for example, an acceleration or deceleration or a retarding effect. Basically this involves the application of force, a lesser force, a stronger force, etc.

The particular position and detection of the movement of the control device 13 is converted into, in most cases, an electrical signal subjected to power amplification in an amplifier 14. This amplifier may include integrating stages depending on the control characteristics as between lever deflection as input and the output to be produced. Basically the amplifier 14 can of course also be a hydraulic element which increases, i.e., amplifies the force with which the operator actuates the manual control 13 to convert a specific displacement of the manual control into a large force, to thereby influence the control system 15.

The control system 15 may for example be a machine tool designated in general as object 30 which operates on a workpiece. The operation is generally denoted with "output" which may be the effect the controlled system, for example a machine tool, has on a workpiece in dependence upon the power input for the control system 15 as controlled by the amplification unit 14 the "output" will vary. The transfer characteristics as between the manual control 13 and the resulting "output" depends entirely on the circumstances. However, the following general rule can be stated facilitating the understanding of the invention.

For any particular portion of the manual control 13, the device 15 will enter into a force relationship with the object 30, i.e., the device will exert a particular force upon the object 30, and the object exerts a reaction upon the device 15. When the forces are equal, the device 15 will move relative to the object 30 at a constant speed or be motionless which is only a special case of the general, constant speed situation. Depending upon the particular case, the object's reaction force will in most cases be a friction type retardation and/or a resilient reaction, or a combination thereof. For example, if device 15 is a power saw, the "output" will be the progression of cutting due to the force which the saw exerts on the object to be sawed. If the saw is of the rotary type, the blade will rotate at a constant speed as long as the material offers the same resistance. Any change in one of the forces, is now effective as an acceleration (or deceleration) of the device 15, even a very minute one as there is no such thing as absolute stiffness, hardness, rigidity, etc. This change in the forces is not transmitted to the manual control 13, though being effective in the controlled system 15 and possibly in the power amplifier 14; such change in the output load is not fed back as a driving force upon the manual control, for example, a lever. Thus, the operator does not feel any change in the force relationship as between controlled device and object, nor any acceleration or deceleration.

It is now presumed that the control system 15, its input and/or the output is subjected in addition to disturbances which have the influence that they vary the "output" in relation to the value or condition should have for the particular input condition manually established by the operator. The "output" as it is being in effect is sensed by one or more sensing devices 16 which provides signals representative of either the output of the control system 15 itself or the condition and effect which this output establishes. The effect or output sensors 16 feed their signals to a display device 17 which provides a visible representation of the "output." In most instances the measuring device 16 will control an instrument having a pointer which moves along a scale in a manner that the operator can observe the display.

As symbolically denoted with arrow 18 this visual display of a representation of the output is observed by the operator 10 and forms a part of his external stimulation. It may, however, be advisable to have the effect of the output not displayed directly in form of a pointer deflection over scale having selected units, but the device 17 may in addition be provided for example with an electrical signal derived from a source 19 of reference signals representing the desired value of the "output" so that the indicator 17 actually is a null instrument showing, i.e., displaying an error signal if the "output" deviates from the desired value. Should the control process be of the type in which the desired value vary in time then, of course, the device 17 should display the error signal in which case the display device 17 continuously provides the difference between the output of the measuring device 15 and the output of a variable reference source.

Next there is provided a formation device or network 20 which will respond to the rates of change of the "output." In the most simple form the input sides 21 of this rate of change of sensing device 20 is connected directly to receive the output of the effect sensor 16 which provides, for example, an electrical representation of the output or of the effect of the output or of position or speed of the device 15 in its relation to object 30, and that electrical signal is subjected to differentiation in the device 20.

Alternatively, the input of device 20 may be a signal which is directly derived from the controlled system 15 and being, for example, proportionate to the force exerted by device or system 15 onto the object 30. These two possibilities require some details as to what within the concept of the present invention is understood as rate information: Any change in position (when device 15 is normally immobile) or speed is equivalent to a change in the force differential as between device 15 and object 30. This holds true even if, for example, the device 15 is a power saw driven by a "constant speed-variable torque" type motor. In this case the speed variations may be minute, but they are always there when, for example, the total reactive force exerted by the object upon the saw varies. It thus is a matter of mere convenience of measurement whether one measurs the change in the force differential, or of one of the forces or a change in speed of device 15. Either situation produces rate information showing, per unit of time, a change from previous, stationary conditions, previously evidenced by a constant "output," and now resulting from a change of the interaction between device 15 and object 30, and that rate is sensed by device 20.

This device 20 has two output channels 22 and 23 respectively. The channel 22 will be activated in case the rate of output is positive, i.e., in case the output or the effect of the output increases. The channel 23 will be activated in case the output or the effect of the output decreases. Each one of these channels 22 and 23 when activated energize a tactile transducer denoted with reference numerals 24 and 25 respectively. The connection between the rate of output of device 20 and the transducers 24 and 25 is such that the respectively activated transducer sets up a vibration the frequency of which is, for example, proportional to the value, i.e., the magnitude of the rate signal provided into the particular channel, 22 or 23. Of course, in case the "output" remains constant the transducers 24 and 25 do not provide any signal but do so only in case of changes.

Figure 2:
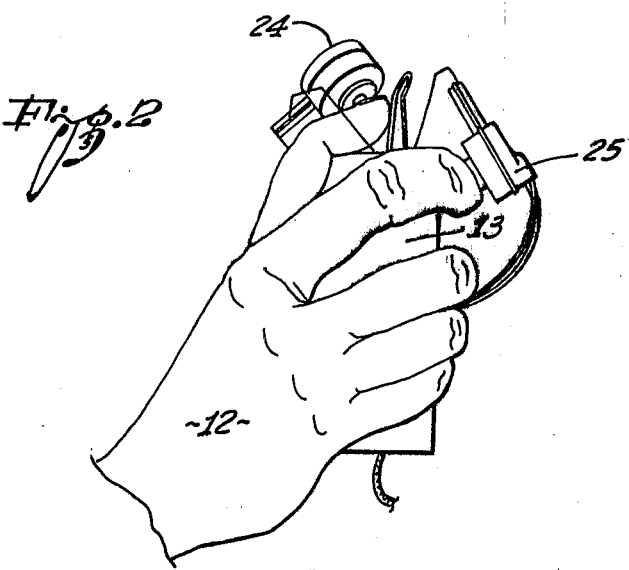
FIG. 2 illustrates a view of a pair of tactile transducers as attached to the hand of an operator manipulating a control stick.

It can be seen here, particularly when referring to FIG. 2, that these vibratory, tactile transducers are attached, for example, to the thumb and the index finger of the hand gripping the manual control device 13. As symbolically indicated by the arrows 26 and 27, these transducers 24 and 25 provide further external stimuli effective in this case at the skin of the operator. Therefore the operator is made aware of a beginning change in the "output" and by a signal the strength of which depends on the "speed" of the output change. At such time the visual display 17 will show some but very little changes, as the pointer of the display device 17 only registers completed changes and not the process of changing.

Therefore the operator is made aware of the change in the output, i.e., of a change in the force differential as between device 15 and object 30, at a time when the output itself has yet very little changed. He is being made aware of the change in conditions by means other than by visual display, which means that as far as stimulation is concerned he consciously or subsciously very clearly keeps these two different displays apart. He knows and he has learned that the visual display provided by device 17 shows conditions as they are, while the sensations he notices at his fingers represent the occurrence of changes of the conditions prior to completion thereof. As symbolically denoted with the channel 21' the rate information may be derived from an additional source in case the display device 17 includes an error signal forming network in which, as was described above, a reference signal from a source 19 is compared with the signal from the sensor 16 representing the output of the effect of the output. In this type of system it is required for a satisfactory control anticipation to consider that the error may be due to a change in time of the reference signal. That change is not per se noticeable anywhere in the system 15–30. From the standpoint of control, the two cases of error formation, disturbances on variable reference are equivalent as both cases will result, if no further measures are being taken, in the deviation of the "output" from the desired value. Therefore, the rate information should in this case also be drawn from the reference, as is symbolically denoted by line 21'.

Figure 3:
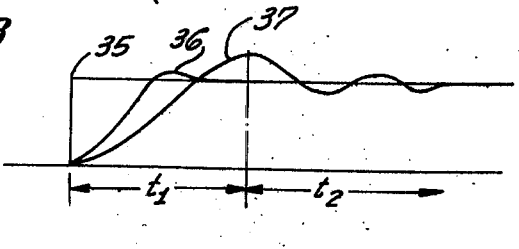
FIG. 3 illustrates a graph in which curves are plotted showing the control effect with and without tactile link in a system of the type shown in FIG. 1 and for a step function type error.

In FIG. 3 there is shown now a typical response curve showing the improved precision obtained by the use of a combined visual-tactile display system. The curve 35 represents a step function, for example in the error signal as produced and displayed by the visual display device 17. The step function 35 in particular represents in this case a stepwise change in the reference signal.

Curve 37 now represents the corresponding "output" or effect of "output" resulting from typical or average manual control by an operator who observes the visual display device 17 and does not receive tactile information. This curve 37 has two portions. The first portion extending approximately over the time $t_1$ is what is conventionally called the result of a ballistic movement performed by the operator. I.e., upon observing the jump in the error signal he will make a movement with his hand gripping the manual control 13 in a manner tending to correct this error. It is a common experience, that this ballistic or more or less uncontrolled movement will invariably result in an overshoot. Therefore, after the period $t_1$ there follows a period $t_2$ in which by small and attempted precise movements of the manual control device 13 the operator will try to reduce the error signal back to zero, accompanied by several overshoots. As a result the output will over the period of time $t_2$ produce several oscillations, usually of decreasing amplitude as a result of continued small overshooting, until the operator is able to stabilize the system.

By experience it was found that the situation is quite different if the operator is aided by the tactile transducers 24 and 25. The curve 36 reperesents the resulting output change if he is aided by non-visual rate indication. It has to be noted that the main effect of the rate signal tactually applied provides an increase in overall system gain to reduce the damping ratio in the system. An attempt to explain this effect points to some psychological aspect and theory of response to directional cues.

The behavioral process is simpled if the operator has two, quite different types of display to go on. One display, i.e., the visual display device 17, shows either the state of the output system itself or the error, i.e., the nature of the error itself, necessarily after it has occurred. Superimposed upon this display is a tactile information as an indication how to correct the error as it builds up. Therefore the operator is enabled to correct the error prior to full occurrence thereof. The ballistic or slewing motion which the operator will tend to perform upon seeing an already existing large error as visually displayed in 17 will be more precisely controlled if he has in addition tactile information which not merely indicates to him that an error is building up but also shows the speed of the error, and, therefore, the first ballistic slowing motion with which he will move the lever occurs possibly before the full error is visible, but at least it occurs when additionally the operator is subjected to a tactile warning display system tending to show the rate of the error build-up. Experience has shown that thereby he will perform the movement of the control stick or handle in a much more accurate and more controlled manner in comparison to the case if he has to rely on the visual display alone.

Figure 4:
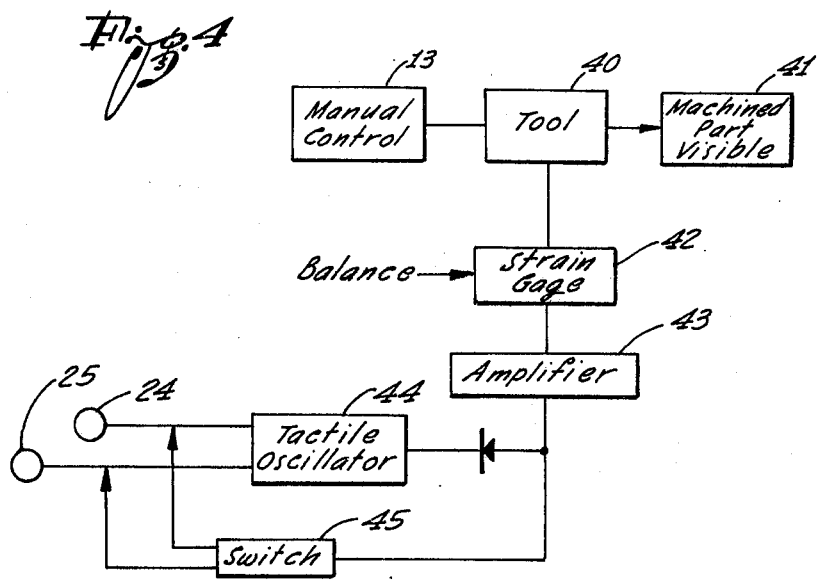
FIG. 4 illustrates somewhat schematically a block diagram of a modification of the embodiment shown in FIG. 1.
Figure 5:
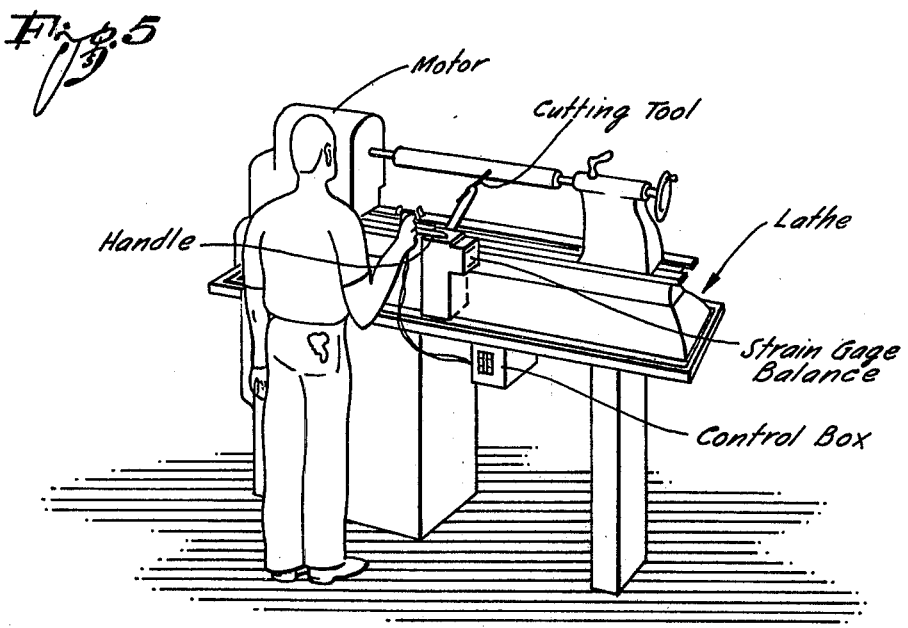
FIG. 5 illustrates a simplified, perspective view of a lathe with operator linked by a system as shown in FIG. 4.

FIG. 4 illustrates somewhat schematically what can be described as a simplified system for the control system as shown in FIG. 1. Specifically a machine tool operation is envisioned here. The block 13 still points to the manual control device but it is assumed now that with this manual control device, with or without power amplification, the operator handles a tool 40 being of the type in which the operator is able to observe the machined part directly, in which case it has no necessity and sometimes a practical impossibility to attach measuring instruments to the machined part 41. For this case the display of the effect of his control is the machined part itself which the operator observes while operating the tool through the manual control 13. Due to support of the tool 40 on the bench, it is impossible for the operator to directly sense through the manual control 13 the reaction force of the machined part 41. There is thus provided for example a strain gage 42 attached to the tool itself measuring the strength-stress relationship as between tool and machined part 41. Here we must carefully observe the nature of the process. In order to perform any operation at all, for example, in order to operate lathes, some pressure must be exerted continuously by the tool 40 upon the machined part 41. That pressure will result in a particular rate of removal of material in order to provide for this machining. The particular rate of such removal is correct. Thus, by operation, i.e., positioning of the manual control so that the removal rate of the lathe is constant, stationary conditions are established between tool force and counter or reaction force.

If now for some reason the balance of force is disturbed, for example because of inhomogeneities in the workpiece, then the amount of material removed may be more or less. Since this is an integral effect, the error is compounding. A change in the force exerted by the tool upon the machined part is thus rate information, and the increasing amount of material that is removed in excess of or below the desired amount per unit of time is in this case an ever increasing error.

As stated above, tool pressure relates to a bending moment applied to the shank of the tool, and the strain, of course, is proportional to the stress imposed. Therefore upon measuring the strain of the tool one can measure the force applied by the tool to the machined part. From the strain gage 42 one derives a rate error whenever the strain on the tool changes.

In case of such a deviation the strain gage produces an output, positive or negative, and amplified by an amplifier 43. An output amplifier 43 is applied to an oscillator, for example, a voltage controlled oscillator responding only to the magnitude but not to the sign of the rate information. A sign-responsive switch 45 causes the output of the oscillator to be applied to one or the other tactile transducers 24, or 25.

The invention is not limited to the embodiments described above but all changes and modifications thereof not consituting departures from the spirit and scope of the invention are intended to be included.

What is claimed is:

1. A system for performing semi-automatic control operations on conditions of objects, operating means removably coupled to an object for interacting with the object resulting in a particular reaction of the object upon the operating means;

first means provided in relation to the object and the operating means to monitor the reaction upon the operating means as a particular condition of the object, and providing at least one train of signals representative thereof;

second means connected to the first means to be responsive to one train of said signals and including an indicator providing a visual representation of the particular condition in any instant representative of balanced state of interaction between the object and the operating means;

third means connected to the first means to be responsive to one train of said signals and deriving therefrom a second train of signals representative of the rate of change of said particular condition;

fourth means connected to the third means and providing tactile vibrations having a characteristic dependency upon said second train; and manually operating means positioned in relation to the second means and the fourth means, so that the human operator can observe the indicator and feel the tactile vibrations, the manually operating means connected to the operating means for providing an output governing said interaction of the operating means and the object and the resulting particular condition of the object.

2. In a system for controlling the interaction of an element with a particular object, the interaction resulting in the exertion of force by the element upon the object and a reaction force exerted by the object upon the element, comprising:

manually operated control means connected to the element and including a manually operated part for controlling position and movement of the element in relation to the object, the control means including means operating the element for increasing or decreasing the amount of force exerted by the element upon the object in response to a change in manipulation of the manually operated part of the control means, a resulting change in reaction force being effective only in the element, there being no transmission of force back to the manually operated part of the control means;

first means connected to the element for monitoring a change in the relation of said forces as rate information, independent from a change in the manipulation of the manually operable part of the control means;

second means connected to the first means for monitoring and producing oscillations representative of direction and amplitude of the rate information; and at least one tactile transducer for mounting to the skin of an operator manipulating the manual control means, and connected to the second means for receiving said oscillations for transmission as vibratory signals to the operator.

3. In combination:

a machine tool for performing operations on solid objects when in predeterminable positions relative to a solid object thereby undergoing an interacting relationship with the solid object including the exertion of force on the object and receiving a reaction force exerted by the object on the tool;

means connected to the tool for monitoring a change in the relationship between said forces and producing a signal representative thereof;

at least one tactile transducer for attachment to the skin of an operator and receiving said signal for transmitting a corresponding vibration to the operator characteristically depending upon said signal;

first means for manipulating said machine tool; and second means connecting the first means to the tool to change the position of the tool in response to manipulation of the first means, thereby changing the force exerted by the tool upon the object, a change in the reaction between tool and object being ineffective in the first means.

4. The combination as in claim 6 comprising:

a first tactile transducer responsive to said rate signal when having a first polarity and providing a vibration having a characteristic dependency upon said rate signal; and a second tactile transducer responsive to said rate signal when having a polarity opposite to said first polarity and providing a vibration also having a characteristic dependency upon said rate signal.

5. In combination for interaction with an object:

first means provided for interaction with the object to establish a particular position relative to the object thereby exerting a predeterminable force upon the object resulting in a reaction force by the object upon the first means;

second means connected for controlling the position of the first means and including signal amplifying means to establish the force exerted by the first means upon the object, further including manual operable means to provide the signal to the amplifying means, the amplifying means isolating the manual operable means from the reaction force exerted by the object upon the first means;

third means connected to be responsive to the reaction provided by the object and providing as rate signal representative of a change in the reaction; and at least one tactile transducer for mounting to the skin of an operator manipulating the manual operable means and connected to the third means to provide vibrations in response to the rate signal provided by the third means.

6. The combination set forth in claim 5, at least the manual operable means disposed in relation to the first means and the object, to permit direct observation of the position relation between object and first means.

7. The combination as set forth in claim 5, and including fourth means coupled to the first means to provide a visible indication of the force-position relation of the first means relative to the object at any instant.

8. The combination as set forth in claim 5, the first means being a tool, the object being a workpiece, the third means sensing tool pressure exerted upon the workpiece and providing the rate signal in response to a change in tool pressure.

References Cited
UNITED STATES PATENTS

| | | | |
|---|---|---|---|
| 2,078,982 | 5/1937 | Stark | 340—407 |
| 2,978,689 | 4/1961 | Tech et al. | 340—267 X |
| 3,056,953 | 10/1962 | Tripp | 340—267 X |
| 3,157,853 | 11/1964 | Hirsch | 340—27 |

JOHN W. CALDWELL, Primary Examiner

PERRY PALAN, Assistant Examiner

U.S. Cl. X.R.

73—90; 340—267, 407